United States Patent [19]

Yokokura et al.

[11] 4,406,126
[45] Sep. 27, 1983

[54] SECONDARY AIR SUPPLY SYSTEM FOR AUTOMOBILE ENGINE HAVING SUPERCHAGER

[75] Inventors: Tsunetoshi Yokokura, Hiroshima; Tsuyoshi Tsuchida, Iwakuni, both of Japan

[73] Assignee: Toyo Kogyo Co., Ltd., Hiroshima, Japan

[21] Appl. No.: 340,336

[22] Filed: Jan. 18, 1982

[30] Foreign Application Priority Data

Jan. 26, 1981 [JP] Japan .................... 56-10598

[51] Int. Cl.³ .............. F02B 37/00; F01N 5/04; F01N 3/30
[52] U.S. Cl. ............................ 60/605; 60/280; 60/293; 60/602
[58] Field of Search ............ 60/280, 293, 600, 602, 60/605

[56] References Cited

U.S. PATENT DOCUMENTS 4,244,187  1/1981  Lane ........................... 60/280

FOREIGN PATENT DOCUMENTS 53-126423  11/1978  Japan ........................... 60/293
530746  12/1940  United Kingdom .......... 60/605

Primary Examiner—Douglas Hart
Attorney, Agent, or Firm—Wenderoth, Lind & Ponack

[57] ABSTRACT

A secondary air supply system for an internal combustion engine having a supercharger comprises a secondary air supply valve operable in response to the pulsating flow of exhaust gases emitted from at least one of engine cylinders. The remaining engine cylinders are communicated to an exhaust gas purifying device through a supercharger so that the exhaust gases emitted therefrom can drive a turbine of the supercharger. The exhaust gases emitted from such at least one of the engine cylinders are directly supplied to the exhaust gas purifying device in admixture with a secondary air supplied by the valve to facilitate an effective and efficient purification of the exhaust gases as a whole.

4 Claims, 2 Drawing Figures

SECONDARY AIR SUPPLY SYSTEM FOR AUTOMOBILE ENGINE HAVING SUPERCHARGER

BACKGROUND OF THE INVENTION

The present invention generally relates to a secondary air supply system in an automobile internal combustion engine having a supercharger for controlling the supply of a secondary air required by an exhaust gas purifying device.

The use of a supercharger, or a turbo charger or turbo supercharger as it is generally called, is not a new and recent development nowaday. The supercharger is known as a means effective to boost the power of the engine with a minimized fuel consumption and generally contains a compressor and a turbine linked together by a common shaft. The supercharger is usually driven by the turbine which is in turn driven by exhaust gases emitted from the engine, although on some engines the supercharger is driven by a belt or gears from the engine instead of by an exhaust-gas turbine.

For driving the exhaust gas turbine of the supercharger, the prior art is such that exhaust gases emitted from all of the engine cylinders are supplied, before they reach an exhaust gas purifying device such as a catalytic converter or an afterburner, to a turnbine chamber in which the turbine is located.

On the other hand, it is well known to those skilled in the art that the exhaust gas purifying device, particularly the afterburner or the catalytic converter of a type wherein an oxidizing catalyst or a combination of oxidizing and reducing catalysts is utilized, requires the supply of an additional air, i.e., a secondary air, to achieve an effective and efficient purification of the exhaust gases with the quantitative requirement thereof varying with the engine operating condition. In view of this, irrespective of the employment of the supercharger, most conventional internal combustion engines employ a secondary air supply pump, driven by, for example, the engine, for supplying the secondary air to the purifying device in dependence on the engine operating condition and this is exemplified by, for example, the U.S. Pat. No. 4,139,983, patented Feb. 20, 1979.

However, the employment of the secondary air supply pump in combination with the supercharger increases the manufacturing cost of an automobile vehicle and is likely to reduce the engine power output characteristic. In order to obviate these disadvantages, an improvement has been made to utilize a portion of a supercharged air, flowing towards the engine cylinders, as a secondary air to be supplied to the exhaust gas purifying device. This is disclosed in, for example, the Japanese Laid-open Utility Model Publication No. 50-137411, laid open to public inspection in 1975.

According to the Japanese publication, there is disclosed an autimobile internal combustion engine having its fuel intake port communicated through a supercharged air supply duct to a discharge port leading from a compressor chamber of the supercharger and its exhaust port communicated through an exhaust passage to the turbine chamber of the supercharger and then to the atmosphere. This publication also discloses the alternative employment of a thermal reactor and a catalytic converter, the thermal reactor being disposed on the exhaust passage whereas the catalytic converter is to be disposed on an exhaust duct leading from the turbine chamber to the atmosphere. For supplying the supercharged air as the secondary air to the exhaust gas purifying device, a secondary air supply passage is employed having one end communicated to the supercharged air supply duct and the other end communicated to a portion of the exhaust passage upstream of the thermal reactor or the exhaust passage itself in the case of the catalytic converter employed.

Although the secondary air supply passage disclosed in the above mentioned Japanese publication incorporates therein a control valve adapted to be controlled by various parameters representative of the engine operating condition, there is the possibility that, during a certain engine operating condition, for example, a low load, low speed operating condition, in which the supercharger is substantially unable to compress the air, no sufficient amount of air will be supplied to the purifying device via the engine cylinder. Considering the fact that a relatively large amount of the secondary air is required during such particular engine operating condition, the system disclosed in the above mentioned Japanese publication appears to go beyond the requirement, although the concept is sophisticated in that no secondary air pump is required.

Apart from the combined use of the supercharger and the secondary air supply system, there has also been well known to supply the secondary air by the utilization of a pulsating flow of exhaust gases emitted from the internal combustion engine. In this system, a check valve constituted by, for example, a reed valve is used so that it can selectively be opened and closed in response to the pulsating flow of the exhaust gases emitted from one of the engine cylinders to effect the supply of the secondary air. This system is quitely simple in structure as compared with the system using the secondary air supply pump and is, therefore, largely used in most automobile vehicles.

However, when it comes to the employment of the reed valve in combination with the supercharger, it has not yet been realized because there has been encountered a difficulty in accommodating two contradictory requirements. More specifically, while a portion of the exhaust system downstream of the engine and upstream of the turbine with respect to the direction of flow of the exhaust gases towards the purifying device is dominated by a relatively high back pressure and the pulsation of the exhaust gases flowing downstream of the turbine is decelerated, the supercharger, more specifically, the exhaust gas turbine, requires a positive pressure derived from the exhaust gases with minimized pulsating flow characteristic to operate and, on the other hand, the reed valve requires the exhaust gases with increased pulsating flow characteristic to operate.

SUMMARY OF THE INVENTION

Accordingly, the present invention has been developed with a view to substantially eliminating the disadvantages and inconveniences inherent in the prior art systems and has for its essential object to provide a secondary air supply system for an automobile internal combustion engine having a supercharger, wherein a secondary air supply device operable in response to the pulsating flow of exhaust gases is utilized.

Another important object of the present invention is to provide a secondary air supply system of the type referred to above, wherein no engine-driven pump is required to effect the supply of the secondary air and which is, therefore, less expensive to manufacture.

A further object of the present invention is to provide a secondary air supply system of the type referred to above, which is effective to effect the supply of the secondary air at all engine operating conditions to the exhaust gas purifying device.

In order to accomplish these objects, the present invention is featured in that some of the engine cylinders are communicated to the exhaust gas purifying device while the remaining engine cylinders are communicated to the exhaust gas purifying device through the turbine chamber of the supercharger. Exhaust gases emitted from such some of the engine cylinders are used to effect the supply of the secondary air to the exhaust gas purifying device while the exhaust gases emitted from such remaining engine cylinders are used to drive the turbine.

BRIEF DESCRIPTION OF THE DRAWINGS

These and other objects and features of the present invention will become apparent to those skilled in the art from the following description taken in conjunction with preferred embodiments thereof with reference to the accompanying drawings, in which.

DETAILED DESCRIPTION OF THE EMBODIMENT

Figure 1:
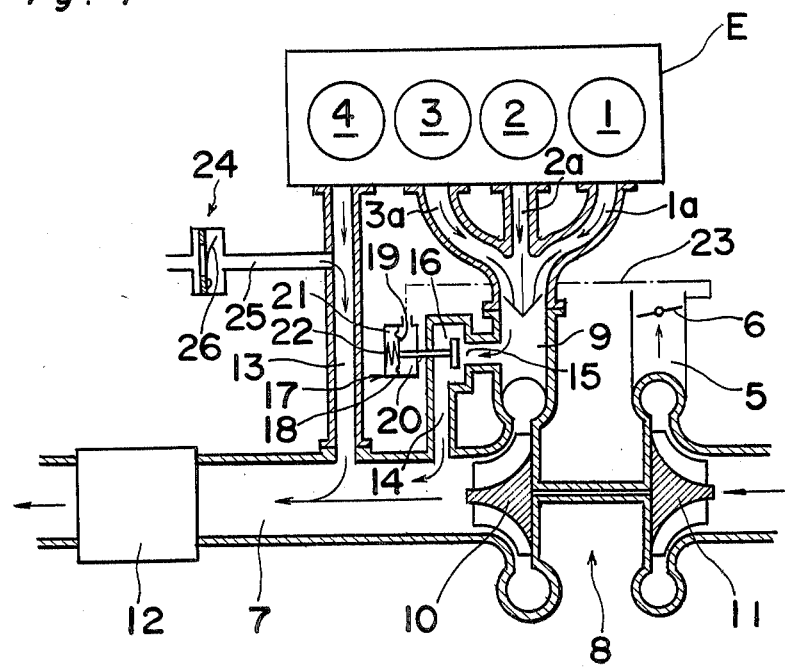
FIG. 1 is a schematic sectional view showing an automobile internal combustion engine having a supercharger and a secondary air supply system according to the present invention.

Referring to FIG. 1, there is shown an automobile internal combustion engine E having four engine cylinders 1, 2, 3 and 4. As is well known to those skilled in the art and as is commonly practised in the art, the firing is typically carried out in the sequence of the cylinder 1, the cylinder 3, the cylinder 4 and the cylinder 2. The engine cylinders 1 to 4 have their respective fuel intake ports communicated to a source of air, for example, an air cleaner (not shown) through a fuel intake duct 5, having a throttle valve 6 incorporated therein as well known to those skilled in the art, and then through a compressor chamber of a supercharger 8, the compressor chamber having therein a compressor 11 which, when rotated, compresses the incoming air to be supplied to the engine cylinders 1 to 4 in admixture with fuel supplied in a manner well known to those skilled in the art.

In accordance with the present invention, respective exhaust ports of the engine cylinders 1 to 3 are communicated to associated exhaust pipings 1a, 2a and 3a which are in turn fluid-connected to a first exhaust duct 9. The first exhaust duct 9 is in turn communicated to an exhaust pipe 7 through a turnbine chamber of the supercharger 8 having a turbine 10 accommodated therein, said pipe 7 being communicated to the atmosphere through an exhaust gas purifying device 12 which may be constituted by either a catalytic converter or a thermal reactor. As is well known to those skilled in the art, the turbine 10 and the compressor 11 are coupled to each other so that the both can rotate simultaneously.

An exhaust port of the remaining engine cylinder 4 is communicated through a second exhaust duct 13 to a portion of the exhaust pipe 7 upstream of the purifying device 12 and downstream of the turbine chamber of the supercharger 8 with respect to the direction of flow of exhaust gases towards the atmosphere.

In order to avoid the air flowing through the fuel intake duct 5 from being excessively pressurized, that is, in order to maintain the supercharged air at a constant value, there is provided a valve-controlled bypass passage 14 having one end communicated to the first exhaust duct 9 and the other end communicated to a portion of the exhaust pipe 7 upstream of the purifying device and downstream of the turbine chamber. The bypass passage 14 includes a shut-off valve 16 for selectively opening and closing a waste gate 15 defined in such passage 14, which shut-off valve 16 is controlled by a diaphragm assembly 17 which will now be described.

The diaphragm assembly 17 comprises a casing 18 having its interior divided by a diaphragm member 19 into a working chamber 20 and an atmospheric chamber 21, and an actuating rod having one end rigidly connected to the shut-off valve 16 and the other end rigidly connected to the diaphragm member 19. The atmospheric chamber 21 communicated to the atmosphere has a biasing spring 22, for example, a compression spring, for urging the valve 16 to close the waste gate 15 in the bypass passage 14, whereas the working chamber 20 is communicated through a signalling passage 23 to a portion of the intake duct 5 downstream of the throttle valve 6 with respect to the direction of flow of the air towards the engine cylinders 1 to 4. The diaphragm assembly 17 is so designed that, when the negative pressure developed inside that portion of the intake duct 5 downstream of the throttle valve 6 exceeds a predetermined value, the diaphragm member 19 can be displaced against the biasing spring 22 to cause the shut-off valve 16 to open the waste gate 15 in the bypass passage 14, thereby substantially interrupting the supply of the exhaust gases to the turbine chamber of the supercharger 8 with the turbine 10 consequently stalling. By so doing, the supercharged air can be maintained at a predetermined value.

The second exhaust duct 13 extending between the engine cylinder 4 and the exhaust pipe 7 as hereinbefore described is communicated to a source of secondary air (not shown), which may be the same air cleaner as hereinbefore described, through a secondary air supply passage 25 having a secondary air supply control device 24 installed thereon. This secondary air supply control device 24 is constituted by a check valve 26 which may be a reed valve and which, when opened in a manner as will be described later, permits the introduction of a secondary air therethrough into the second exhaust duct 13. As is well known to those skilled in the art, the exhaust gases emitted from each of the engine cylinders flow in a pulsating manner because of a cycle of the combustion, and this pulsating flow of the exhaust gases is utilized to control the operation of the secondary air supply control device 24, that is, the check valve 26. More specifically, the check valve 26 cyclically open and close the passage 25 in response to the pulsation of the exhaust gases flowing through the second exhaust duct 13 and, in a corresponding pulsating manner, the secondary air is admitted into the second exhaust duct 13 and then into the exhaust pipe 7.

The secondary air supply system according to the present invention and constructed as hereinbefore described operates in the following manner.

Assuming that the engine is operated under a low load condition, the exhaust gases emitted respectively from the engine cylinders 1, 2 and 3 adjoin in the first exhaust duct 9 and then are supplied to the turbine chamber to drive the turbine 10. Thereafter, they are emitted to the atmosphere after having passed through the purifying device 12. The rotation of the turbine 10 results in the rotation of the compressor 11 and, accordingly, the air to be supplied onto the intake duct 5 is supercharged and, after having been mixed with fuel in an appropriate air-fuel mixing ratio, distributed to the engine cylinders 1 to 4.

On the other hand, exhaust gases emitted from the engine cylinder 4 are introduced through the second exhaust duct 13 into the intake pipe 7 and are then emitted to the atmosphere through the exhaust gas purifying device 12. During the flow of the exhaust gases through the second exhaust duct 13, the secondary air is drawn through the check valve 26 into the second exhaust duct 13 in response to the pulsating flow of such exhaust gases and, accordingly, the exhaust gases to be supplied to the purifying device 12 through the second exhaust duct 13, even though they are ultimately admixed with the exhaust gases discharged from the turbine chamber 20 of the supercharger 8, contain a relatively large amount of fresh air necessary to facilitate an effective and efficient purification of the exhaust gases as a whole.

As described above, it is clear that the turbine 10 can be driven steadily by a combination of the exhaust gases emitted from the engine cylinders 1 to 3, the flow characteristic of which, when viewed in terms of an input to the turbine 10, is generally considered continuous, not pulsating, whereas the check valve 26 responds fairly to the pulsating flow of the exhaust gases emitted from the engine cylinder 4.

Where the engine E is operated under a high load condition, the pressure of the exhaust gases inside the first exhaust duct 9 increases to such a value that the turbine 10 and, hence, the compressor 11, tend to be rotated at a high speed with the consequence that the air excessively supercharged may be supplied to the intake duct 5. However, since the negative pressure developed inside that portion of the intake duct sownstream of the throttle valve 6 is high during the high load engine operating condition, the diaphragm member 19 is displaced by a portion of the negative pressure introduced from the intake duct 5 into the working chamber 20 through the signalling passage 23, thereby causing the shut-off valve 16 to open the waste gate 15 in the bypass passage 14. Accordingly, the exhaust gases emitted from the engine cylinders 1 to 3 are permitted to flow from the first exhaust duct 9 into the exhaust pipe 7 through the bypass passage 14 without passing through the turbine chamber of the supercharger 8. The consequence is that the rotation of the turbine 10 and, hence, that of the compressor 11, is retarded, thereby avoiding the supply of the excessively supercharged air into the intake manifold 5.

Although the above description of the present invention has been made in connection with the preferred embodiment wherein the engine E has four engine cylinders 1 to 4, the concept of the present invention can equally be applicable to any internal combustion engine having two, three or four or more engine cylinders. In the case of the engine having three engine cylinders, one of the engine cylinders should be fluid-connected to the second exhaust duct 13 while the remaining engine cylinders should be fluid-connected to the first exhaust duct 9. In the case of the engine having six engine cylinders, a similar description to that made in connection with the three-cylinder engine is applicable, but the following arrangement is more preferred.

Figure 2:
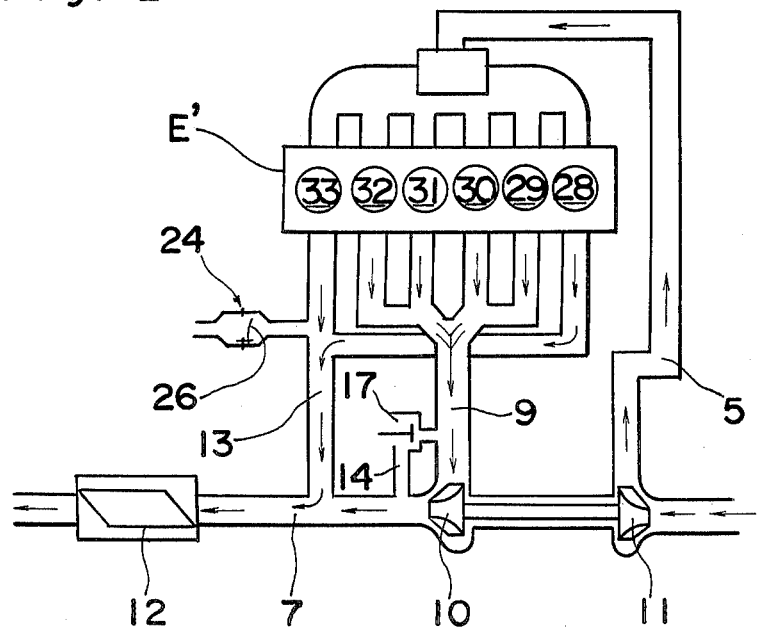
FIG. 2 is a view similar to FIG. 1, showing another preferred embodiment of the present invention.

Referring to FIG. 2, there is shown the internal combustion engine E having six engine cylinders 28, 29, 30, 31, 32 and 33. So far illustrated, the engine cylinders 28 and 33 are communicated to the second exhaust duct 13 while the remaining engine cylinders 29 to 32 are communicated to the first exhaust duct 9. This is particularly applicable where the firing takes place in the sequence of the cylinder 28, the cylinder 31, the cylinder 29, the cylinder 33, the cylinder 30 and the cylinder 32 or in the sequence of the cylinder 28, the cylinder 32, the cylinder 30, the cylinder 33, the cylinder 29 and the cylinder 31. In other words, the engine cylinders to be fluid-connected to the second exhaust duct 13 are those adapted to be fired at respective timings which are spaced the largest length of time in the firing sequence of all of the engine cylinders and which do not occur sequentially. So far as this requirement can be satisfied, a combination of the engine cylinders to be fluid-connected to the second exhaust duct 13 may not be limited to that shown in FIG. 2.

It is to be noted that like parts shown in FIG. 2 are designated by like reference numerals used in FIG. 1 for the sake of brevity.

Although the present invention has fully been described in connection with the preferred embodiments thereof, it is to be noted that various changes and modifications are apparent to those skilled in the art. Such changes and modifications are to be understood as included within the true scope of the present invention unless they depart therefrom.

We claim:

1. A secondary air supply system for an internal combustion engine having a supercharger comprising a turbine chamber having a turbine therein and a compressor chamber having a compressor therein, said turbine being operatively coupled to the compressor for rotation together therewith in one direction, said secondary air supply system comprising, in combination:

a plurality of engine cylinders having their fuel intake ports communicated to the compressor chamber, and also having their respective exhaust ports;

a first exhaust duct means having one end fluid-connected to some of the exhaust ports of the respective engine cylinders and the other end communicated to an inlet port of the turbine chamber;

an exhaust pipe having one end communicated to an outlet port of the turbine chamber and the other end communicated to the atmosphere;

an exhaust gas purifying device disposed on the exhaust pipe for substantially purifying exhaust gases emitted from all of the engine cylinders;

a second exhaust duct means having one end communicated to the remaining exhaust ports of the respective engine cylinders and the other end communicated to a portion of the exhaust pipe upstream of the exhaust gas purifying device with respect to the direction of flow of the exhaust gases towards the atmosphere; and a secondary air supply means for supplying a secondary air into the second exhaust duct means in response to the pulsating flow of exhaust gases emitted from said remaining exhaust ports.

2. A system as claimed in claim 1, wherein the number of said some of the exhaust ports is larger than that of said remaining exhaust ports.

3. A system as claimed in claim 1, wherein the number of the engine cylinders is four, the number of said some of the exhaust ports is three and the number of said remaining exhaust ports is one.

4. A system as claimed in claim 1, wherein the number of the engine cylinders is six and the number of said remaining exhaust ports is two, and wherein the two engine cylinders having their exhaust ports communicated to the second exhaust duct means are those adapted to be fired at respective timings which are spaced the largest length of time in the firing sequence of all of the engine cylinders and which do not occur sequentially.

* * * * *